INVENTORS.
TOSHIO ITO
TOSHIO MIYAMOTO
YUICHI WADA

BY *Sughrue, Rothwell, Mion, Zinn & Macpeak*

ATTORNEYS.

United States Patent Office
3,488,761
Patented Jan. 6, 1970

3,488,761
CURRENT LIMITING DEVICE
Toshio Ito, Minami-Shimizu, Toshio Miyamoto, Amagasaki-shi, and Yuichi Wada, Hyogo, Japan, assignors to Mitsubishi Denki Kabushiki Kaisha, Tokyo, Japan
Filed Feb. 27, 1968, Ser. No. 708,653
Claims priority, application Japan, Feb. 27, 1967, 42/16,197
Int. Cl. H01h 85/02, 85/46
U.S. Cl. 337—221          10 Claims

ABSTRACT OF THE DISCLOSURE

A current limiting device having a casing sealingly containing an alkali metal which is highly electrically conductive in its condensed state and highly non-conductive in its vaporized state. The case has a pair of terminals in contact with the alkali metal. A resistance is connected between the terminals and has a value at least approximately that of the alkali metal in its vaporized state.

BACKGROUND OF THE INVENTION

This invention relates to a self-restoring current limiting device utilizing the current limiting properties of vaporized alkali metal.

SUMMARY

The current limiting device of the present invention includes alkali metal which is liquid or solid at ordinary temperatures. The metal is contained in a casing and is vaporized by flow of a short circuit current to effect current limitation. The casing is composed of resistance material and is electrically connected across the current limiting material, thus preventing occurrence of abnormal voltage during the current limiting operation. The current limiter of the present invention has the advantage over the conventional fuse in that it is capable of repeated current limiting operations. In order to effect the desired operation, a special current limiting material is required. This material must be a good electrical conductor at ordinary temperatures; be vaporized by joule heat produced by the current to be limited; must show extremely higher resistance than the short circuit impedance of the circuit; and, after current limiting operation, be again liquidized or solidified by cooling or replacement to restore to the initial good electrical conductor. Alkali metals such as sodium, calcium, etc. and mercury possess such characteristics. While any current limiting material possessing such characteristics may be used, the casing in which it is housed must have sufficient strength to safely withstand the increased pressures due to vaporization of the current limiting material. This problem has been solved by the use of a casing equipped with a pressure absorber.

DESCRIPTION OF THE PREFERRED EMBODIMENTS

Figure 1:
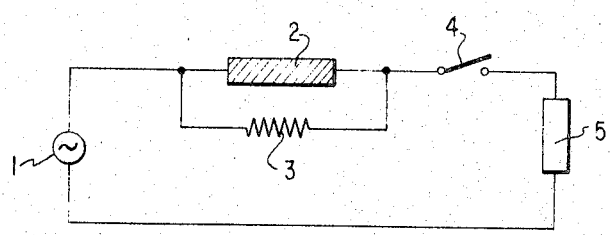
FIGURE 1 is a principal circuit-diagram of this invention.

FIGURE 1 is a principal circuit diagram of the present invention in which a current limiter and a separate resistance unit in parallel are provided for suppression of abnormal voltage. In that figure, 1 is an AC electric source, 2 a current limiter according to the present invention, 3 a resistance connected across current limiter 3 in parallel, 4 a circuit breaker or isolating switch connected in series to current limiter 2, and 5 a load. By provision of resistance 3 in parallel to the current limiter 2 the current changing rate $di/dt$ in the current limiting process is held to a small value, preventing abnormal voltages.

Figure 2:
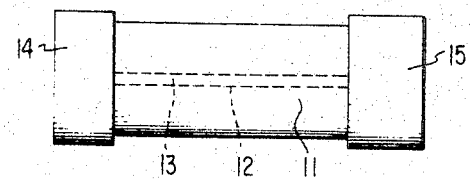
FIGURE 2 is an outline drawing showing an embodiment of this invention.
Figure 3:
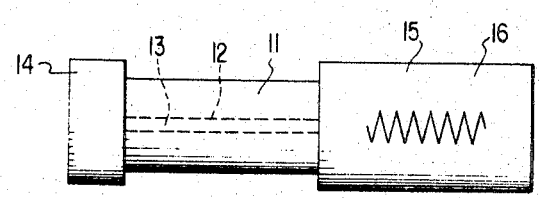
FIGURE 3 is an outline drawing showing a second embodiment of this invention.

FIGURE 2 and FIGURE 3 each show an embodiment of the current limiter 2 of FIGURE 1. A casing 11 having a tube 12 near its center is made of high resistance material or is impregnated or painted with such material. With reference to the material, detailed explanation will be given later on. A current limiting material 13 is carried in tube 12 the ends of the tube being sealed and supported by members 14 and 15. These sealing members are also used as connecting terminals to the external circuit. A pressure absorber 16 for suppressing and maintaining pressure rise due to vaporization of the current limiting material 13 is provided in the embodiment shown in FIGURE 3. Where there is no provision of a pressure absorber, the pressure rise by vaporization of current limiting material 13 may reach 4600 atm. for mercury and 2000 atm. for calcium assuming plasma temperature 5000° K. In such a case, the casing 11 must be constructed of sufficiently rigid material to withstand such high pressure. On the contrary, in case of FIGURE 3, since the pressure absorber 16 is provided, the pressure rise by vaporization of current limiting material 13 can be restricted and maintained within a range of 100–200 atm. Therefore it is sufficient to provide a casing having only sufficient strength to withstand pressures of 100–200 atm. From the view point of mechanical strength, some materials which are usable for the casing will be as follows.

(A) Porcelain material
    (a) Lucalox (crystal of alumina)
    (b) Cojelite ($2MgO2Al_2O_35S_iO_2$)
    (c) Beryllia ($B_eO$)
    (d) Boronnidride (BN)
    (e) Zircon ($Z_rO_2 \cdot S_iO_2$)
    (f) Alumina ($Al_2O_3$)
    (g) Steatite ($MgO \cdot S_iO_2$)
    (h) Quartz, tempered glass (SiO2) and soforth.
(B) Organic Material
    (a) Carbon fibre laminated reinforced plastic
    (b) Glass fibre laminated reinforced plastic
    (c) Metallic wire filament reinforced rubber and plastic
    (d) Teflon (mixed with graphite powder)
    (e) Pyrolitic graphite (epoxide mixed with graphite powder)
    (f) Pyrolitic graphite (epoxide mixed with SiO powder).

The resistance value of casing 11 in which the current limiting material 13 is held must be extremely higher than the resistance of current limiting material 13 at ordinary temperature. For instance, the resistance value casing 11 should be nearly the same as or higher than the resistance value of the vaporized current limiting material 13. Casing 11 may be made with a resistance satisfying the above requirement by suitable blending composite components or by impregnating or painting appropriate resistance substance into the above described material.

Figure 4:
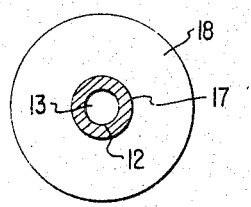
FIGURE 4 is a sectional drawing showing another embodiment.

Now, porcelains under (A) are normally insulating materials. However, cojelite, zircon and alumina can be made to possess a suitable value of resistance by mixing and melting with an adequate kind of metal at the time of sintering. Thermet is one example of products manufactured by such process. The porcelain material under (A) other than alumina and the glass fibre laminated reinforced plastic etc. under (B) can be made to possess suitable values of resistance by painting resistance paint on the surface. The other organic materials under (B) excepting the glass fibre-laminated reinforced plastic have suitable resistance properties. These can be also manufactured any substance having suitable resistance by changing the mixture ratio of carbon powder or by employment of resistance wire as metallic wire filament. Particularly the pyrolytic graphite is a crystalline graphite which has been produced by carbonization of high molecular hydrocarbon gas at high temperature, so that its resistance value has directional character, and its specific resistance in a certain special direction is considerably high compared with the ordinary graphite. Also, it is very strong in mechanical strength. Thus this is an extremely effective material for use as the casing 11. Moreover in quartz, tempered glass etc., it is well known that at the high temperature such as when the current limiting operation is taking place the creeping resistance is lowered. Therefore, the resistance of current limiting material is from one to ten times as large as the resistance value of the vaporized current limiting material 13. Further it is well known in such hot pressed molded products (for instance, Micarex) using mico powder as a base material and glass powder as a bonding material that their surface resistance varies at high temperature. Consequently as shown in the embodiment of FIGURE 4, such a current limiter can also perform the same function as if tube 12 were filled with the current limiting material 13 if the tube is composed of the above quartz or hot pressed molded products. Insulating material 18 having a pressure proof character and a substantially infinitive resistance is arranged on the periphery of said tube 12.

While the invention has been particularly shown and described with reference to preferred embodiments thereof, it will be understood by those skilled in the art that various changes in form and details may be made therein without departing from the spirit and scope of the invention.

What is claimed is:
1. A current limiting device comprising:
 (a) a current limiting alkali metal material having a condensed state in which it is highly electrically conductive and a vaporized state in which it is highly non-conductive;
 (b) a casing sealingly containing said current limiting material;
 (c) terminal portions on said casing in electrical contact with said current limiting material; and
 (d) a resistance element connected between said terminal portions having a resistance value at least approximately that of said current limiting material in its vaporized state.

2. A current limiting device as defined in claim 1 wherein said resistance element and said casing are composed of one body.

3. A current limiting device as defined in claim 1 in which said resistance element is located on the internal surface of said casing.

4. A current limiting device as defined in claim 2 in which said resistance element is located on the internal surface of said casing.

5. A current limiting device as defined in claim 1 wherein at least a portion of said casing is composed of resistance material, that portion of the casing being said resistance element.

6. A current limiting device as defined in claim 2 wherein at least a portion of said casing is composed of resistance material, that portion of the casing being said resistance element.

7. A current limiting device as defined in claim 1 wherein said resistance element is said casing which is impregnated with resistance material.

8. A current limiting device as defined in claim 2 wherein said resistance element is said casing which is impregnated with resistance material.

9. A current limiting device as defined in claim 1 wherein said resistance element possesses a comparatively high resistance value at steady state and is capable of reducing its resistance value in response to a temperature rise in the interior of said casing.

10. A current limiting device as defined in claim 3 wherein said resistance element possesses a comparatively high resistance value at steady state and is capable of reducing its resistance value in response to a temperature rise in the interior of said casing.

References Cited
UNITED STATES PATENTS

| | | | |
|---|---|---|---|
| 3,333,049 | 7/1967 | Humphrey et al. | 174—102 |
| 3,113,193 | 12/1963 | Jacobs | 337—221 |
| 2,911,504 | 11/1959 | Cohn | 337—296 |

VOLODYMYR Y. MAYEWSKY, Primary Examiner

D. M. MORGAN, Assistant Examiner

U.S. Cl. X.R.

337—290